US006536625B2

(12) United States Patent
Chang

(10) Patent No.: US 6,536,625 B2
(45) Date of Patent: Mar. 25, 2003

(54) MACHINE FOR VENDING PRODUCTS ONE AT A TIME FROM LOWER ENDS OF CIRCULAR ROW OF COLUMNS

(76) Inventor: Kil Jae Chang, T.Pico. Korea Manufacturing, 321-37 Suksu, 2 Dong, Anyang City, Kyungdido (KR)

( * ) Notice: Subject to any disclaimer, the term of this patent is extended or adjusted under 35 U.S.C. 154(b) by 0 days.

(21) Appl. No.: 10/135,167

(22) Filed: Apr. 29, 2002

(65) Prior Publication Data

US 2002/0117508 A1 Aug. 29, 2002

Related U.S. Application Data

(63) Continuation of application No. 09/669,218, filed on Sep. 25, 2000, now Pat. No. 6,378,724.
(60) Provisional application No. 60/156,016, filed on Sep. 23, 1999.

(51) Int. Cl.[7] .................. B65G 59/00
(52) U.S. Cl. .................. 221/132; 221/155
(58) Field of Search .................. 221/155, 24, 97, 221/131, 199, 132, 195, 277, 282

(56) References Cited

U.S. PATENT DOCUMENTS

| | | | | |
|---|---|---|---|---|
| 629,505 A | | 7/1899 | Hollands | |
| 736,980 A | | 8/1903 | Kneedler | |
| 1,347,558 A | | 7/1920 | Simon | |
| 2,208,298 A | | 7/1940 | Mahaffey | 312/95 |
| 3,104,028 A | | 9/1963 | Brown | 221/86 |
| 4,284,206 A | | 8/1981 | Wittern | 221/90 |
| 4,876,532 A | | 10/1989 | Sauls | 340/689 |
| 5,339,985 A | | 8/1994 | Perez | 221/151 |
| 5,472,074 A | | 12/1995 | Milcetic | 194/342 |
| 5,485,939 A | | 1/1996 | Tucker | 221/86 |
| 5,732,852 A | | 3/1998 | Baker et al. | 221/116 |
| 6,378,724 B1 | * | 4/2002 | Chang | 221/24 |

* cited by examiner

*Primary Examiner*—Kenneth W. Noland
(74) *Attorney, Agent, or Firm*—John R. Flanagan; Flanagan & Flanagan

(57) ABSTRACT

A machine and method for vending products perform the operational steps of storing a multiplicity of products in a plurality of vertical columns thereof that are organized in a circular row wherein the products in each vertical column are disposed one above another and can feed downward due to the influence of the force of gravity, incrementally rotating the plurality of vertical columns of products simultaneously about a circular path wherein lowermost ones of the products in the vertical columns thereof one at a time per revolution advance and cross over an inlet opening to a dispensing path, and dispensing the lowermost ones of the products of the vertical columns thereof through the inlet opening by use of a separation fixture that prevents products from dropping directly into the inlet opening from the vertical columns when aligned above the inlet opening while letting products drop into a lowermost circular row thereof located below the columns and from the lowermost circular row one at a time through the inlet opening.

10 Claims, 6 Drawing Sheets

MACHINE FOR VENDING PRODUCTS ONE AT A TIME FROM LOWER ENDS OF CIRCULAR ROW OF COLUMNS

This patent application is a continuation of application Ser. No. 09/669,218, filed Sep. 25, 2000 now U.S. Pat. No. 6,378,724, and through said application also claims the benefit of U.S. provisional patent application No. 60/156,016, filed Sep. 23, 1999.

BACKGROUND OF THE INVENTION

1. Field of the Invention

The present invention generally relates to coin-operated vending machines and, more particularly, is concerned with a vending machine and method for vending products one at a time from lower ends of a circular row of vertical columns of the products.

2. Description of the Prior Art

One general type of product that is well-known and universally popular and thus desirable to be able to dispense from a vending machine is a lollipop. The lollipop typically has an elongated thin stick-like handle for gripping by a consumer and a piece of candy of spherical, round or similar shape mounted on one end of the handle and covered by a wrapper of paper or the like prior to the purchase of the product by a consumer. Because of its makeup, the lollipop is difficult to store in large quantities in a vending machine and still be able to reliably and effectively dispense one at a time from the machine.

Vending machines of various constructions have been proposed in the prior art for dispensing a variety of products. Some representative examples of these prior art vending machines are found in U.S. Pat. No. 629,505 to Hollands, U.S. Pat. No. 736,980 to Kneedler, U.S. Pat. No. 1,347,558 to Simon, U.S. Pat. No. 2,208,298 to Mahaffey, U.S. Pat. No. 3,104,028 to Brown, U.S. Pat. No. 4,284,206 to Wittern, U.S. Pat. No. 4,876,532 to Sauls, U.S. Pat. No. 5,339,985 to Perez, U.S. Pat. No. 5,472,074 to Milcetic, U.S. Pat. No. 5,485,939 to Tucker, and U.S. Pat. No. 5,732,852 to Baker et al. Only the Milcetic and Tucker patents are directed to handling the dispensing of lollipops.

While these prior art devices appear to be satisfactory in use for the specific purposes for which they were designed, none of them seem to provide an optimum solution to the problem of being able to store large quantities of lollipops while also at the same time being able to dispense them one at a time. Consequently, a need still exists for an innovation which will provide a solution to the aforementioned problem in the prior art without introducing any new problems in place thereof.

SUMMARY OF THE INVENTION

The present invention provides a vending machine and method designed to satisfy the aforementioned need. The vending machine and method of the present invention provides for storing and dispensing of products, such as lollipops, in a highly organized and reliable manner. More particularly, the vending machine and method of the present invention provide and enhance the efficient utilization of the space occupied by lollipops within the machine, close control of each lollipop within the machine in terms of its location and movement at any given time, organized arrangement of the lollipops within the machine in a systematic fashion, and repeatable dispensing of the lollipops from the machine one at a time in response to each user inserting a coin into and turning a knob of a coin deposit station of the machine.

Accordingly, the present invention is directed to a machine for vending products which comprises: (a) a free-standing housing having upper, middle and lower sections, the lower section including a product discharge station, the middle section defining an opening to the lower section; (b) a product storage and dispensing magazine disposed in the upper section of the housing and rotatably supported therein by the middle section of the housing, the magazine including means defining a circular row of vertical channels having lower open ends such that products can be stored in circularly-arranged vertical columns thereof within the vertical channels with the vertical columns of products tending to move and feed downward through the open lower ends of the vertical channels due to the influence of the force of gravity; (c) a magazine indexing drive mechanism disposed in the upper and middle sections of the housing and being drivingly coupled to and operable to cause rotation of the magazine such that the magazine can be incrementally rotated about a circular path; (d) a product separation fixture disposed in and mounted by the middle section of the housing adjacent to the lower open ends of the vertical channels such that in response to operation of the drive mechanism the magazine rotates relative to the separation fixture and advances in succession lowermost ones of the products in the vertical columns thereof to the opening in the middle section of the housing where the products one at a time fall downward through the opening, the separation fixture overlying the opening and blocking a vertical path to the opening of products from the vertical columns thereof directly above the opening while still allowing passage of the products into the lowermost circular row thereof and one at a time to below the separation fixture and into the opening of the middle section of the housing; and (e) means disposed in the lower section of the housing for receiving a product which drops through the opening of the middle section of the housing and transferring the product through the lower section of the housing and into the product discharge station thereof.

The present invention also is directed to a method of vending products which comprises the steps of: (a) storing a multiplicity of products in a plurality of vertical columns thereof that are organized in a circular row wherein the products in each vertical column are disposed one above another and can feed downward due to the influence of the force of gravity; (b) incrementally rotating the plurality of vertical columns of products simultaneously about a circular path wherein lowermost ones of the products in the vertical columns thereof one at a time per revolution advance and cross over an inlet opening to a dispensing path; and (c) dispensing the lowermost ones of the products of the vertical columns thereof through the inlet opening by use of a separation fixture that prevents products from dropping directly into the inlet opening from the vertical columns when aligned above the inlet opening while letting products drop into a lowermost circular row thereof located below the columns and from the lowermost circular row one at a time through the inlet opening.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
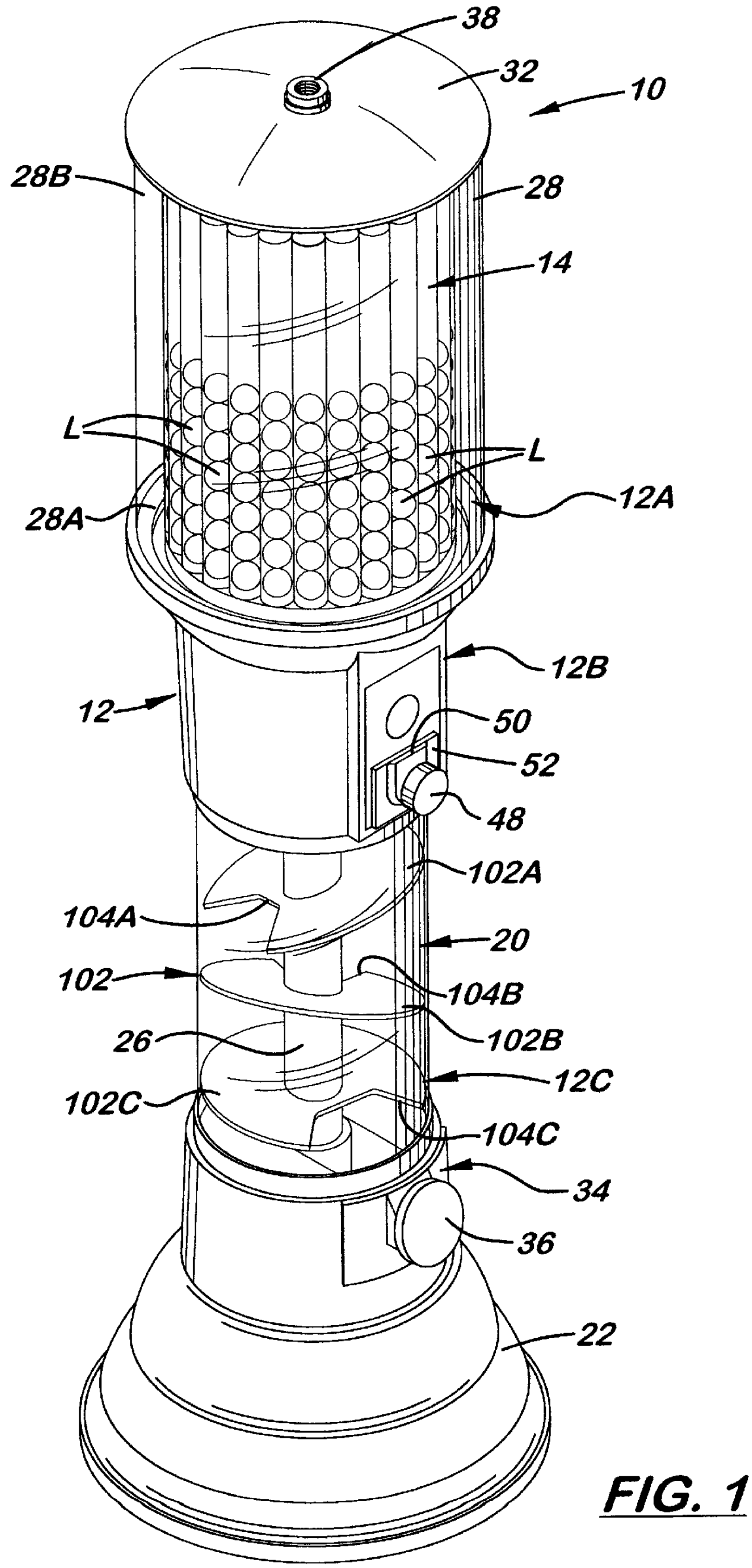
FIG. 1 is a perspective view of a vending machine of the present invention.
Figure 2A:
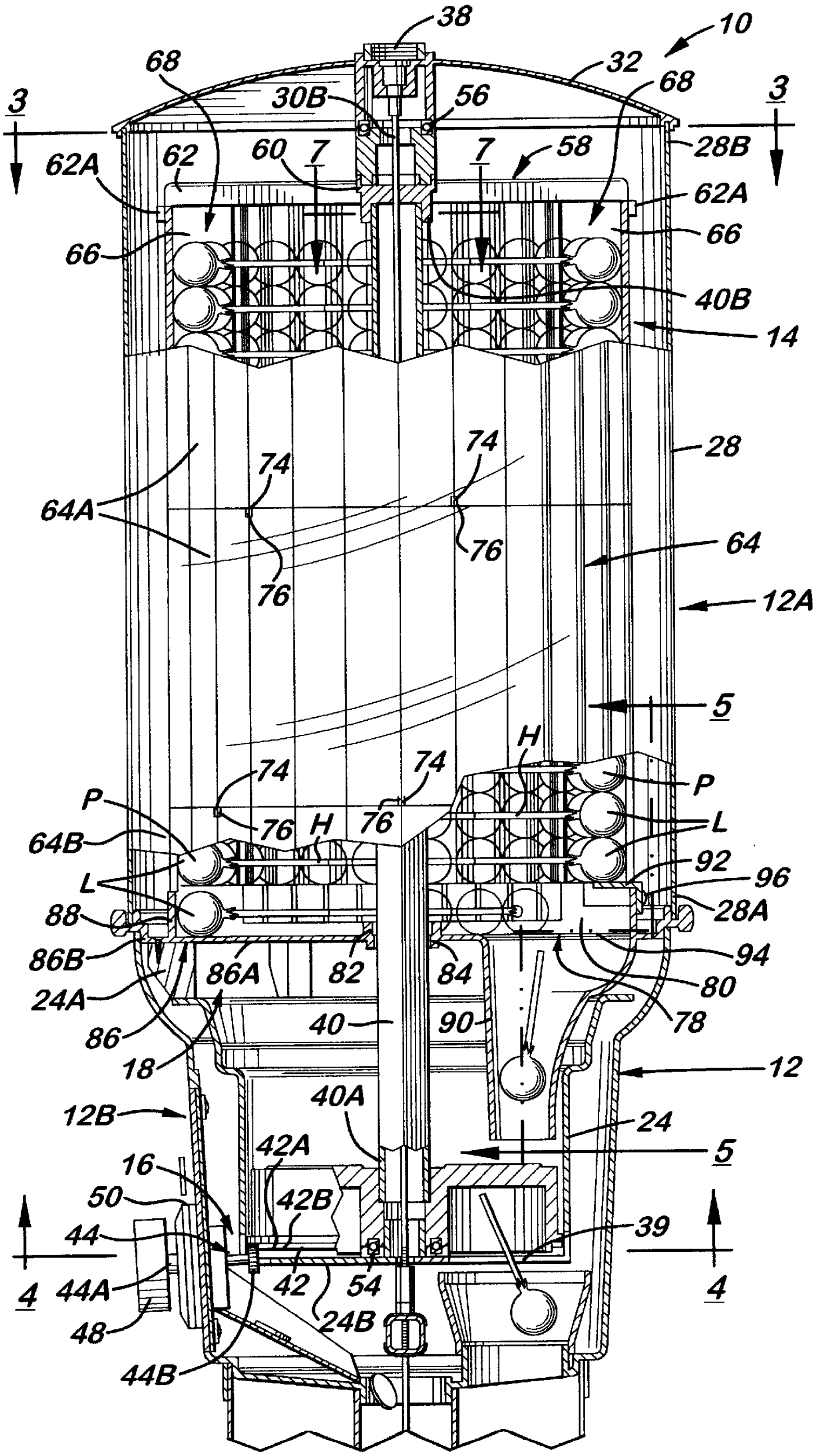
FIG. 2 is an enlarged side elevational view of the machine of FIG. 1 showing some portions broken away and other portions in section.
Figure 2B:
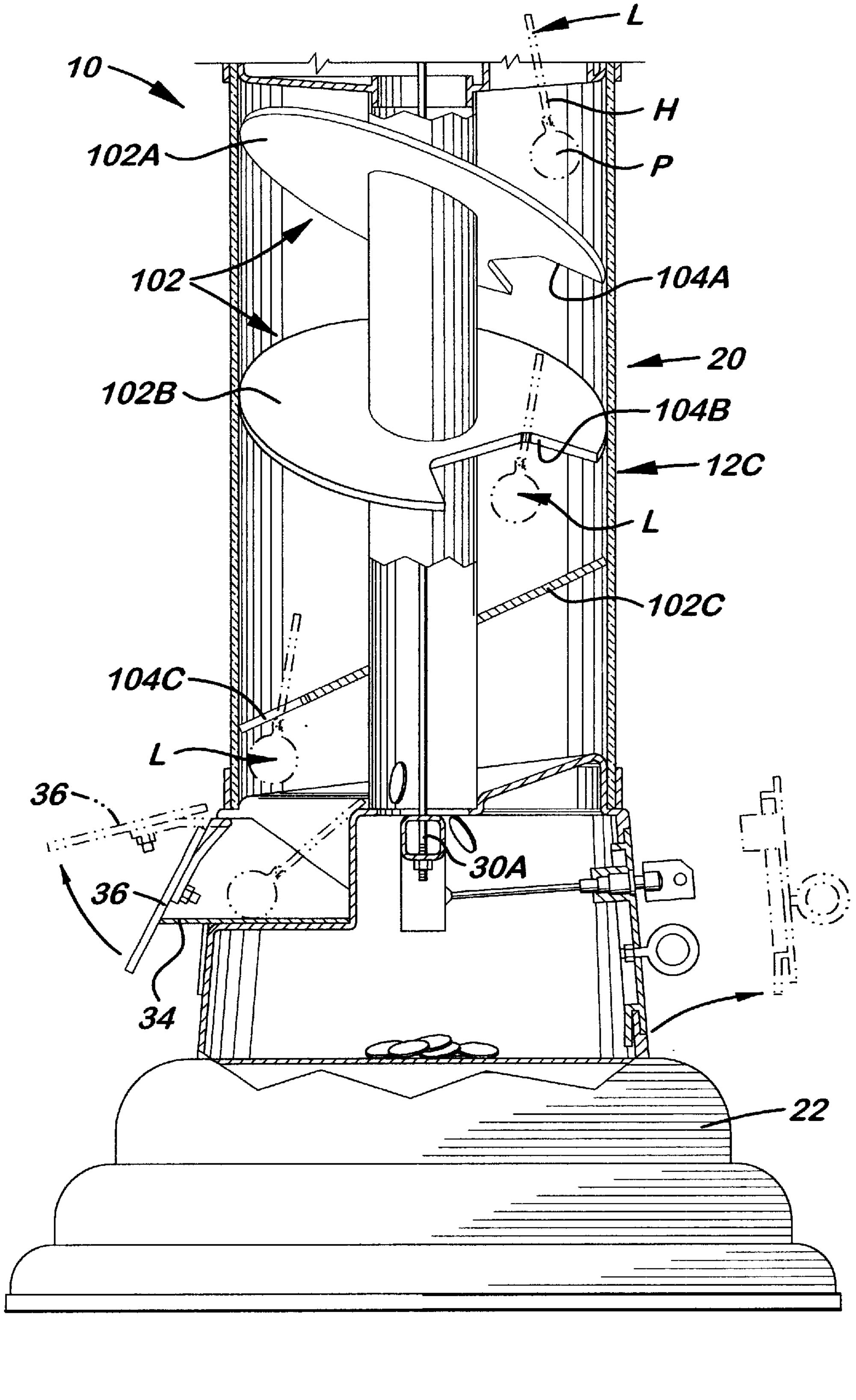
Figure 3:
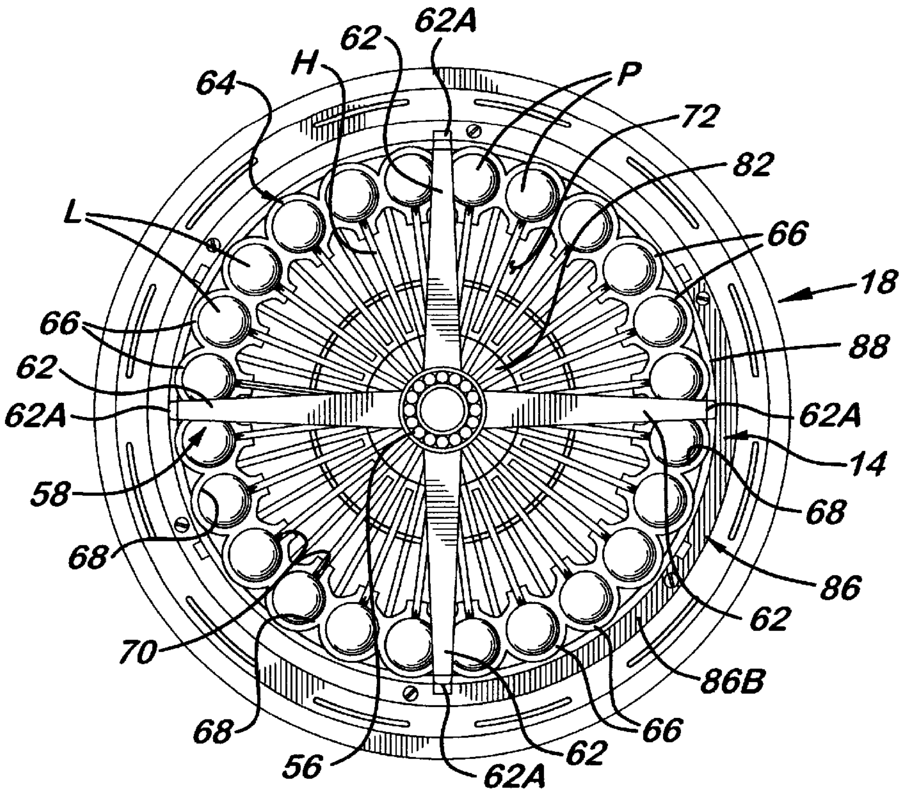
FIG. 3 is a top plan view of the machine as seen along line 3—3 of FIG. 2.

Referring to the drawings and more particularly to FIGS. 1 and 2, there is illustrated a coin-operated product vending machine, generally designated 10, of the present invention which operates and functions in accordance with the vending method of the present invention for storing and dispensing products, such as lollipops L. The machine 10 basically includes a freestanding housing 12, as best seen in FIGS. 1 and 2, having upper, middle and lower sections 12A, 12B, 12C, a product storage and dispensing magazine 14, as best seen in FIGS. 1–3 and 5, disposed in the upper section 12A of the housing 12, a magazine indexing drive mechanism 16, as best seen in FIGS. 1–4 and 7, disposed in the upper and middle sections 12A, 12B of the housing 12, a product separation fixture 18, as best seen in FIGS. 2, 5, 6 and 8–10, disposed in the middle section 12B of the housing 12, and a product transfer arrangement 20, as best seen in FIGS. 1 and 2, disposed in the lower section 12C of the housing 12.

Referring still to FIGS. 1 and 2, the freestanding housing 12 of the machine 10 also includes a bottom base 22, a middle receptacle or hopper 24, an elongated tubular lower support member 26, an outer tubular enclosure 28, a central elongated rigid tie or connector rod 30, and a top lid 32. The bottom base 22 is located in the lower section 12C of the housing 12 where the housing 12 is supported upon a support surface, such as a floor. The bottom base 22 includes a product discharge station 34 and a pivotal door 36 thereon movable between a closed position and an open position for respective blocking and allowing access to products received by the product discharge station 34. The elongated lower support member 26 is mounted upon the bottom base 22 and extends upwardly through the lower section 12C of the housing 12 and supports the middle hopper 24 in the middle section 12B of the housing 12 in a spaced relationship above the bottom base 22. The outer tubular enclosure 28 is cylindrical in configuration and made of a transparent material, encloses the upper section 12A of the housing 12, and is supported at its open lower end 28A upon an upper periphery 24A of the middle hopper 24. As best seen in FIG. 2, the central rigid tie or connecting rod 30 is fixedly mounted at a lower end 30A to a cross member 22A of the bottom base 22, extends therefrom upwardly through the lower tubular support member 24 of the lower section 12C of the housing 12 and through a bottom panel 24B of the middle hopper 24 of the middle section 12B of the housing, and upwardly therefrom through the upper section 12A of the housing 12 to an upper end 30B disposed above an open upper end 28B of the outer tubular enclosure 28. The middle hopper 24 has an opening 39 defined through the bottom panel 24B thereof. The top lid 32 seats upon the upper end 28B of the outer tubular enclosure 28 and is releasably fastened by a suitable conventional key lock mechanism 38 to the upper end 30B of the central rigid connecting rod 30.

Figure 4:
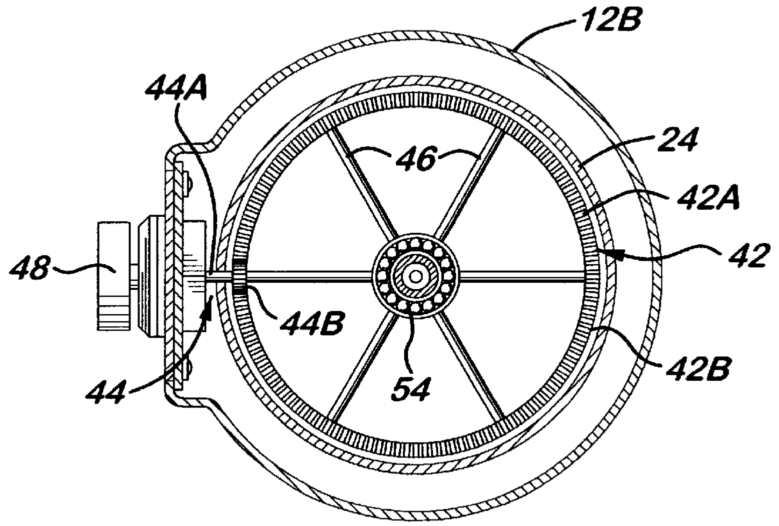
FIG. 4 is a cross-sectional view of the machine taken along line 4—4 of FIG. 2.

Referring now to FIGS. 1–4 and 7, the magazine indexing drive mechanism 16 is rotatably supported on the bottom panel 24B of the middle hopper 24 of the housing 12. The magazine indexing drive mechanism 16 includes a rigid central hollow vertical driven shaft 40 having opposite lower and upper ends 40A, 40B, a horizontal annular driven gear 42 having a teeth 42A arranged in a circular row and projecting downwardly from a bottom side 42B (as seen in FIGS. 2 and 4) of the driven gear 42, and a peripherally-located drive gear 44 having a drive shaft 44A and teeth 44B defined circumferentially about the drive shaft 44A of the drive gear 44 and projecting radially outward therefrom. The central rod 30 of the housing 12 extends vertically through the central hollow vertical driven shaft 40 of the drive mechanism 16. The annular driven gear 42 encircles and is spaced radially outwardly from the lower end 40A of the driven shaft 40 by a plurality of members in the form of radial spokes 46 extending between and rigidly interconnecting the annular driven gear 42 and driven shaft 40. The teeth 44A of the drive gear 44 mesh with the teeth 42A in the circular row thereof on the bottom side 42B of driven gear 42 which faces toward the bottom panel 24B of the middle hopper 24. The outer end of the drive shaft 44A of the drive gear 44 mounts a knob 48 at the exterior of the middle hopper 24 for rotation with the drive shaft 44A when turned by a user after inserting a coin into a coin slot 50 of a conventional coin deposit station 52 supported by the middle hopper 24 of the machine.

The magazine indexing drive mechanism 16 also includes lower and upper annular bearings 54, 56 and an upper spider 58. The lower and upper annular bearings 54, 56 are disposed respectively at the lower and upper ends 40A, 40B of the central driven shaft 40. The lower bearings 54 rotatably mount and support the driven shaft 40 upon the bottom panel 24B of the middle hopper 24 and enable the driven shaft 40 and the driven and drive gears 42, 44 to be rotated by a user merely turning the knob 48. The upper spider 58 has a central hub 60 and a plurality of radial arms 62 angularly spaced apart about ninety degrees and rigidly attached to and extending radially outwardly from the hub 60. The hub 60 is received over the upper end 40B of the central vertical hollow driven shaft 40 and fixedly attached thereto such that the upper spider 58 will rotate with the driven shaft 40. The radial arms 62 of the upper spider 58 have respective lugs 62A on the outer ends thereof which extend downwardly and interfit with portions of the upper periphery of the product storage and dispensing magazine 14 so as to transmit the rotational motion of the driven shaft 40 and upper spider 58 to the magazine 14. The upper annular bearing 56 is disposed between the central hub 40 of the upper spider 58 and the top lid 32.

Referring now to FIGS. 1–3 and 5, the product storage and dispensing magazine 14 is rotatably supported upon the bottom panel 24B of the middle hopper 24 of the housing 12. The magazine 14 includes means in the form of a generally cylindrical body 64 having a plurality of partitions 66 being vertically arranged and circumferentially spaced about and fixedly attached one to the next so as to define a circular row of vertical channels 68 of the magazine 14 having upper and lower open ends 68A, 68B. The products, such as lollipops L, can be stored in the circumferentially-arranged vertical channels 68 one above the next to form circularly-arranged vertical columns of the products. The partitions 66 of the magazine body 64 also define vertical slots 70 along their inner edges 66A which face toward one another and open into a central interior cylinder of space 72 within the magazine body 64 and also into the vertical channels 68. Head pieces P of the lollipops L are disposed in circularly-arranged columns thereof within the vertical channels 68 with their handles H extending inwardly toward the driven shaft 40 through the slots 70 such that each lollipop L is generally disposed in a horizontal orientation. Because of their vertical orientations, the columns of lollipops L will tend to move and feed downward through the open lower ends 68B of the vertical channels 68 due solely to the influence of the force of gravity and without the need for application of any supplemental mechanical force thereto. The magazine body 64 is made of a suitable transparent material such that the products can be seen both through the body 64 of the magazine 14 and the outer tubular enclosure 28 of the housing 12.

The magazine body 64 is disposed in a concentric relationship about the central driven shaft 40 and preferably is made up of a plurality of subunits or segments 64A, 64B which fit together end-to-end and thus stack one on top of another to form the body 64. This reduces the handling weight of the magazine 14 for persons who must lift the magazine during resupplying or replenishing of lollipops in the machine 10. The segments 64A have complementary male and female elements 74, 76 at the opposite ends thereof which interfit to retain the segments 64A, 64B together in the end-to-end stacked relationship.

Figure 6:
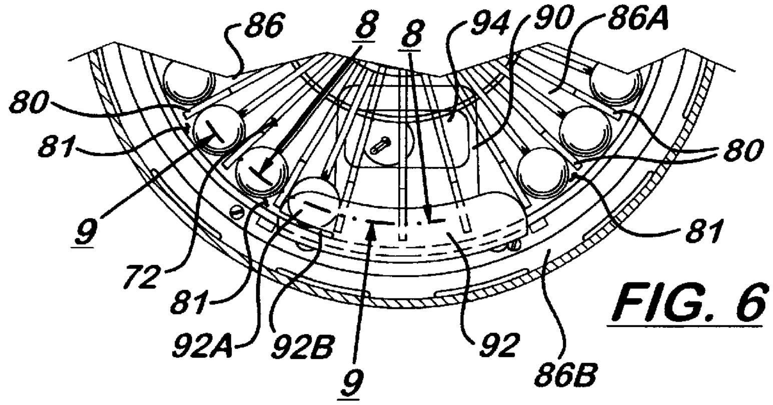
FIG. 6 is a top plan view of the machine as seen along line 6—6 of FIG. 5.
Figure 5:
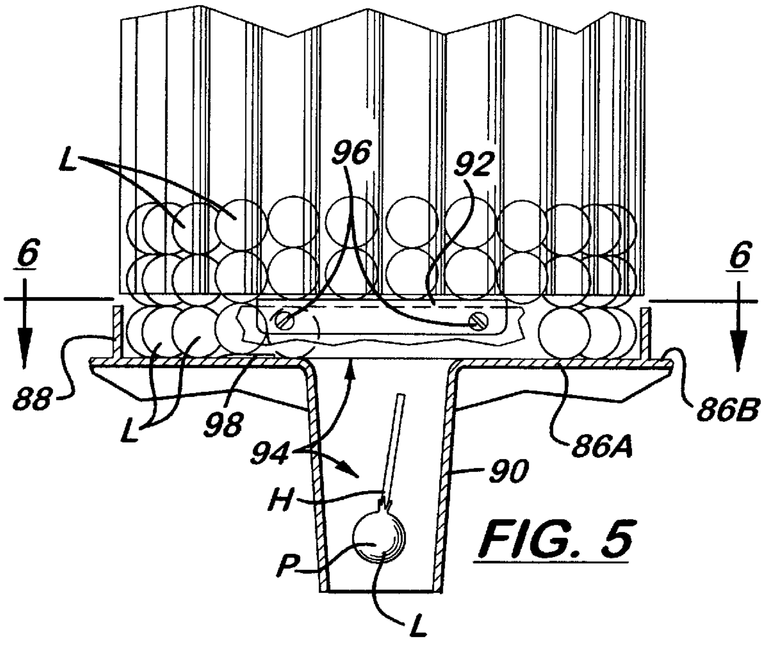
FIG. 5 is a fragmentary side elevational view of the machine taken along line 5—5 of FIG. 2.
Figure 7:
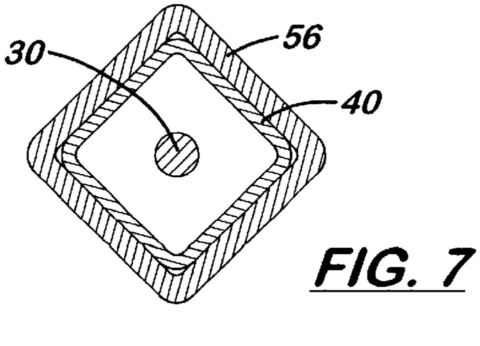
FIG. 7 is an enlarged cross-sectional view taken along line 7—7 of FIG. 2.

The lowermost one of the segments 64B is different from the other segments 64A in that segment 64B has a lower structure 78 rigidly attached to and disposed below the partitions 66 of the segment 64B. The lower structure 78 includes a plurality of radially outwardly directed divider tabs 80, as seen in FIGS. 2 and 6, being circumferentially spaced apart from one another and also spaced below and between the lower open ends 68B of the vertical channels 68 and defining compartments 81 between the divider tabs 80 which respectively receive therein the lowermost products which then make up a lowermost circular row of the products, such as best seen in FIG. 6. The lower structure 78 also includes a bottom central hub 82 which defines a central hole 84 adapted to receive therethrough the central driven shaft 40. Preferably, both the driven shaft 40 and central hole 84 have a similar rectangular shape such that rotation of the central driven shaft 40 will impose a rotational force on the magazine body 64 via the bottom central hub 82 of the bottom structure 78 of the lowermost segment 64B that will assist or augment the rotational force applied on the upper periphery of the magazine body 64 by the lugs 62A on the radial arms 62 of the upper spider 58 in causing the rotation of the magazine body 64 merely by a user turning of the knob 48. Also, each time the user turns the knob 48 of the coin deposit station 52 after inserting a coin in the coin slot 50 thereof, the drive gear 44 rotates through an angular displacement sufficient to move or index the driven gear 42 through an angular distance equal to the center-to-center distance between the vertical channels 68 and thus between the vertical columns of lollipops L. By way of example, there are twenty-four vertical channels 68. Thus, the magazine 14 is rotatably indexed through an angular displacement equal to one twenty-fourth of its circumference each time the knob 48 is turned to cause the vending of a lollipop L.

Referring to FIGS. 2, 5, 6 and 8–10 the product separation fixture 18 is mounted on and about the upper periphery 24A of the middle receptacle or hopper 24 of the housing 12. The magazine body 64 at the lower structure 78 of its lowermost segment 64B rests upon the separation fixture 18 such that the magazine 14 is rotatably supported thereon and can be rotated relative to the separation fixture 18. The separation fixture 18, more particularly, basically includes a circular platform 86, an upstanding annular fence or wall 88, a funnel 90 and a barrier plate 92.

The circular platform 86 of the fixture 18 has an inner main portion 86A and an outer peripheral rim portion 86B supported on the upper periphery 24A of the middle hopper 24 of the housing 12 such that the inner main portion 86A of the platform 86 is disposed in a horizontal orientation somewhat below the elevation of the upper periphery 24A of the middle hopper 24. The upstanding annular wall 88 of the fixture 18 is fixed upright upon the circular platform 86 adjacent to the outer peripheral rim portion 66B thereof and outwardly of and adjacent to the open lower ends 68B of the vertical channels 86 and to the divider tabs 80 of the lowermost segment 64B of the magazine body 64 so as to permit the magazine 14 to be rotated without interference from the annular wall 88 and with the vertical channels 68 located inside the annular wall and thus aligned with and disposed above the inner main portion 86A of the circular platform 86 such that the lowermost ones of the products in the vertical columns thereof will rest upon the inner main platform portion 86A within the respective compartments 82 between the divider tabs 80 and adjacent to the annular wall 88 and be moved therealong by the divider tabs 80 with rotation of the magazine 14.

The funnel 90 of the fixture 18 is attached on and depends below the inner main portion 86A of the circular platform 86 so as to define a passageway 94 therethrough. The funnel 90 is disposed above and aligned with the opening 39 of the middle hopper 24 of the housing 12 such that products advanced by rotation of the magazine 14 to the platform passageway 94 will fall downward through the funnel 90 and therefrom directly to and through the opening 39 of the middle hopper 24 of the housing 12 and therefrom to the product discharge station 34 of the lower section 12C of the housing 12. Also, the bottom central hub 82 of the bottom structure 78 of the lowermost segment 64B of the magazine body 64 extends below the rest of the bottom structure 78 so as to create clearance between the rest of the bottom structure 78 and circular platform 86 which prevents a handle H from wedging therebetween and causing a jamming of the rotation of the magazine 14 relative to the circular platform 86 of the separation fixture 18.

The barrier plate 92 is mounted such as by fasteners 96 to an arcuate segment of the upstanding annular wall 88 and extends inwardly from the top 88A of the wall 88 in a horizontal orientation parallel to and spaced above the inner main portion 86A of the circular platform 86 such that the barrier plate 92 is spaced directly above the passageway 94 through the inner main portion 86A of the circular platform 86. The barrier plate 92 thus overlies and blocks a direct vertical path to the platform passageway 94 of products from those of the vertical columns thereof located directly above the passageway 94 while still allowing dropping of other products angularly displaced from the location of the barrier plate 92 into the lowermost circular row of the products lying on the inner main portion 86A of the platform 86 and movement of the lowermost products one at a time to below the barrier plate 92 and into the passageway 94. As seen in FIG. 2, the lower ends 68A of the vertical channels 68 of the lowermost segment 64B of the magazine body 64 are disposed at an elevation above the barrier plate 92 of the separation fixture 18 and thus pass over the barrier plate 92 upon rotation of the magazine 14 whereas the divider tabs 80 of the lower structure 78 of the lowermost segment 64B of the magazine body 64 are disposed at an elevation below the barrier plate 92 and thus pass under the barrier plate 92 upon rotation of the magazine 14. Each of the divider tabs 80 is spaced a sufficient distance below the elevation of the barrier plate 92 so as to eliminate the possibility of the wrapper of the product from wedging or catching between divider tab 80 and the barrier plate 92 and thereby preventing the product from dropping into the passageway 94.

Figure 8:
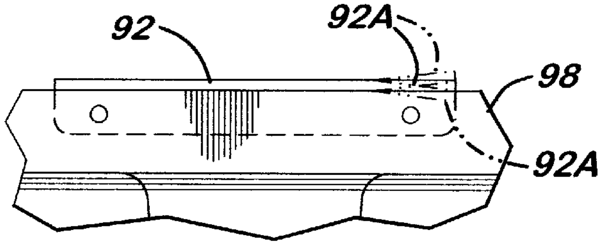
FIG. 8 is an enlarged side elevational view of a barrier plate of a product separation fixture of the machine of FIG. 6 as seen along line 8—8 of FIG. 6.
Figure 9:
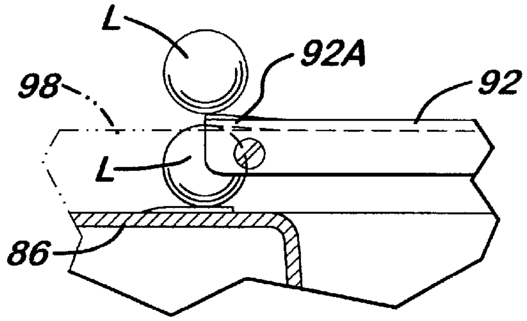
FIG. 9 is a fragmentary enlarged sectional view of a ramp of the product separation fixture defined on a circular platform thereof as seen along line 9—9 of FIG. 6.
Figure 10:
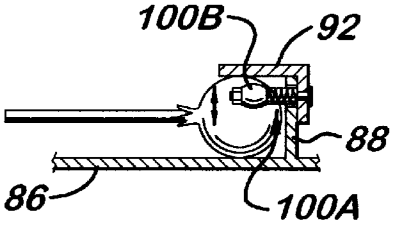
FIG. 10 is an enlarged side elevational view of a resiliently yieldable finger of the product separation fixture mounted to and extending inwardly from an upstanding annular wall thereof.

As seen in FIGS. 6 and 8, the barrier plate 92 also has a leading edge portion 92A which has a short slit 92B made therein that separates the leading edge portion 92A from the upstanding annular wall 88 and thereby adapts the leading edge portion 92A to flex in the vertical direction. Such flexing capability facilitate separation of each lowermost product from the next lowermost product immediately above it in the same vertical column as the products are advanced into contact with the leading edge portion 92A of the barrier plate 92 of the fixture 18 and thus diminishes the likelihood that both products can become wedged between the barrier plate 92 and the platform 86 and impede rotation of magazine or allow both products to drop at the same time through the passageway 94. Furthermore, as seen in FIG. 9, the inner main portion 86A of the platform 86 below the flexible leading edge portion 92A of the barrier plate 92 and adjacent to the passageway 94 has an inclined ramp 98 defined thereon which facilitates lifting vertically of the lowermost product and thus next lowermost product in the same vertical column which assists separating these two products from one another, especially in the case of smaller sizes of products, by the flexible leading edge portion 92A of the barrier plate 92 as these products advance into contact with the leading edge portion 92A of the barrier plate 92. Finally, as seen in FIG. 10, the upstanding annular wall 88 of the fixture 18 has a resiliently yieldable finger 100 mounted thereto and extending outwardly over the passageway 94 adjacent to and downstream of the flexible leading edge portion 92A of the barrier plate 92 relative to the direction of movement of the magazine 14 along its circular path so as to engage and impart a positive downwardly-directed force on the lowermost product that will push the lowermost product downward toward the passageway in the platform 86 of the fixture 18. The finger 100 may be formed by a coiled spring 100A attached to the annular wall 88 and a roller 100B rotatably mounted to an outer end of the spring 100A. The positive action of the finger 100 against each lowermost product will also assist in eliminating a wrapper of the product from catching on some adjacent structure and preventing the product from dropping into the passageway 94. The roller 100B will cause the finger 100 to flex upwardly and allow passage of each of the divider tabs 80 in response to the tab 80 contacting the roller 100B.

Referring again to FIG. 1, the product transfer arrangement 20 extends upwardly from the product discharge station 24 to the product separation fixture 18 of the middle section 12B of the frame 12. The product transfer arrangement 20 includes a plurality of circular discs 102 mounted in surrounding relation about the central lower support member 26 of the housing 12 and disposed in different inclinations relative to the vertical support member 26. An upper one of the discs 102A has its uppermost edge portion located directly below the opening 39 in the bottom panel 24B of the middle hopper 24. A middle one of the discs 102B has its uppermost edge portion located directly below the lowermost edge portion of the upper disc 102A. A lower one of the discs 102C has its uppermost edge portion located directly below the lowermost edge portion of the middle disc 102B and its lowermost edge portion located above the door 36 of the product discharge station 34. There are slots or cutouts 104A, 104B, 104C in each of the discs 102A, 102B, 102C at their respective lowermost edges such that a lollipop L which drops from the separation fixture 14 through the middle hopper 24 and its bottom opening 39 will land on the upper disc 102A, slide down it to and drop through its lower opening 104A, land on the middle disc 102B, slide down it to and drop through its lower opening 104B, land on the lower disc 102C, and slide down it to and drop through its lower opening 104C into the product discharge station 34.

To recapitulate, the above-described features of the vending machine 10 and method of the present invention provide the operational steps of (1) storing a multiplicity of lollipops L in a plurality of vertical columns thereof that are organized in a cylindrical arrangement in the machine 10 wherein the lollipops L lie generally horizontally with their wrapper-bearing candy head pieces P disposed one above another and their handles H generally one above the another also and pointing toward a central vertical axis of the cylindrical arrangement defined by the driven shaft 40, (2) advancing the plurality of vertical columns of lollipops L simultaneously along a circular path wherein the columns of lollipops L revolve about the central vertical axis and each column one at a time per revolution crosses over the inlet opening 39 to the dispensing path through the lower section 12B of the housing 12, and (3) dispensing the lollipops L one at a time consecutively and only from the lower ends of the vertical columns one at a time into the inlet opening, such that a mode of operation is achieved by the machine 10 that is systematic, reliable, repetitive and relatively problem-free.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A machine for vending products, comprising:

(a) a freestanding housing having a product discharge station;

(b) a product storage and dispensing magazine disposed on said housing spaced above said product discharge station and having a body defining a circular row of vertical channels having lower open ends such that products can be stored in circularly-arranged vertical columns thereof within said vertical channels with the vertical columns of products tending to move and feed downward through said open lower ends of said vertical channels due to the influence of the force of gravity, said magazine being rotatable incrementally between a series of dispensing positions along about a circular path, said body of said magazine including a plurality of segments being removably stacked one on top of another so as to form said body, each of said segments defining portions of said vertical channels which store the products in the vertical columns thereof;

(c) means disposed in said housing below said magazine for receiving and dispensing in succession one at a time from said magazine lowermost ones of the products in the vertical columns thereof in response to said magazine being rotated incrementally between said dispensing positions about said circular path; and (d) means disposed in said housing below said receiving and dispensing means for receiving and transferring one at a time the successively dispensed products to said product discharge station of said housing.

2. The machine of claim 1 wherein said segments of said body of said magazine have complementary elements thereon adapted to interfit to retain said segments together one on top of another in an end-to-end stacked relationship.

3. The machine of claim 2 wherein said complementary elements are male and female elements defined at opposite ends of said segments.

4. The machine of claim 1 wherein each of said segments of said body of said magazine has a plurality of partitions being vertically arranged and circumferentially spaced about and fixedly attached one to the next so as to define said vertical channels, said partitions being open at upper and lower ends thereof.

5. The machine of claim 4 wherein said partitions also define vertical slots along inner portions thereof which face toward one another and merge from said vertical channels such that pieces of lollipops can be dispensed in said circularly-arranged vertical columns within said vertical channels with handles of the lollipops extending inwardly through said slots with each lollipop generally disposed in a horizontal orientation such that said vertical columns of lollipops tend to move and feed downward through said open lower ends of said vertical channels due to the influence of the force of gravity.

6. The machine of claim 1 wherein said body of said magazine has a plurality of partitions being vertically arranged and circumferentially spaced about and fixedly attached one to the next so as to define said vertical channels, said partitions being open at upper and lower ends thereof.

7. The machine of claim 6 wherein said partitions also define vertical slots along inner portions thereof which face toward one another and merge from said vertical channels such that pieces of lollipops can be dispensed in said circularly-arranged vertical columns within said vertical channels with handles of the lollipops extending inwardly through said slots with each lollipop generally disposed in a horizontal orientation such that said vertical columns of lollipops tend to move and feed downward through said open lower ends of said vertical channels due to the influence of the force of gravity.

8. The machine of claim 1 wherein said magazine also has an outer tubular enclosure surrounding said body of said magazine and supported upon an upper periphery of said housing.

9. The machine of claim 8 wherein said outer tubular enclosure is made of a transparent material.

10. The machine of claim 9 wherein said magazine also has a top lid adapted to seat upon an upper end of said outer tubular enclosure.

* * * * *